United States Patent
Asplund

(10) Patent No.: US 8,467,163 B2
(45) Date of Patent: Jun. 18, 2013

(54) PROTECTING APPARATUS

(75) Inventor: Gunnar Asplund, Solna (SE)

(73) Assignee: ABB Technology AG, Zurich (CH)

(*) Notice: Subject to any disclaimer, the term of this patent is extended or adjusted under 35 U.S.C. 154(b) by 405 days.

(21) Appl. No.: 12/997,129

(22) PCT Filed: Jun. 9, 2008

(86) PCT No.: PCT/EP2008/057155
§ 371 (c)(1),
(2), (4) Date: Dec. 28, 2010

(87) PCT Pub. No.: WO2009/149744
PCT Pub. Date: Dec. 17, 2009

(65) Prior Publication Data
US 2011/0080679 A1    Apr. 7, 2011

(51) Int. Cl.
*H02H 9/00*  (2006.01)
*H02H 3/20*  (2006.01)
*H02H 9/04*  (2006.01)

(52) U.S. Cl.
USPC ............. 361/56; 361/91.1; 361/111; 361/117

(58) Field of Classification Search
USPC .................... 361/56, 91.1, 111, 117
See application file for complete search history.

(56) References Cited

U.S. PATENT DOCUMENTS

| | | | | |
|---|---|---|---|---|
| 4,571,656 | A * | 2/1986 | Ruckman | 361/56 |
| 5,161,183 | A * | 11/1992 | Maytum | 379/412 |
| 5,559,658 | A * | 9/1996 | Cooper et al. | 361/56 |
| 6,226,162 | B1 * | 5/2001 | Kladar et al. | 361/56 |
| 6,226,166 | B1 * | 5/2001 | Gumley et al. | 361/118 |
| 6,459,559 | B1 * | 10/2002 | Christofersen | 361/124 |
| 6,657,841 | B1 * | 12/2003 | Melchert et al. | 361/100 |
| 7,251,114 | B2 * | 7/2007 | Blasco Claret et al. | 361/127 |
| 7,430,101 | B2 * | 9/2008 | Komulainen et al. | 361/111 |
| 2002/0159212 | A1 * | 10/2002 | Oughton, Jr. | 361/111 |
| 2012/0218672 | A1 * | 8/2012 | Nunes et al. | 361/91.1 |

FOREIGN PATENT DOCUMENTS

| | | |
|---|---|---|
| EP | 0 701 313 A1 | 3/1996 |
| EP | 1 557 923 A1 | 7/2005 |
| EP | 1 715 567 A2 | 10/2006 |
| WO | WO 88/03608 A1 | 5/1988 |
| WO | WO 92/02067 A1 | 2/1992 |

* cited by examiner

*Primary Examiner* — Rexford Barnie
*Assistant Examiner* — Christopher Clark
(74) *Attorney, Agent, or Firm* — Birch, Stewart, Kolasch & Birch, LLP

(57) ABSTRACT

An apparatus for protecting equipment connected to a high voltage direct current line comprises a current valve having at least one semiconductor device and a rectifying member connected in anti-parallel therewith. A surge arrester is configured to connect said current valve to said line, and a control unit is configured to control the current valve to conduct for draining current from the line to ground.

20 Claims, 1 Drawing Sheet

PROTECTING APPARATUS

TECHNICAL FIELD OF THE INVENTION AND BACKGROUND ART

The present invention relates to an apparatus for protecting equipment connected to a high voltage direct current line, said apparatus being configured to obtain said protection by having ground connection means enabling connecting of said line to the ground, said ground connecting means comprising a current valve having at least one semiconductor device of turn-off type connected with a forward conducting direction thereof towards ground and at least one rectifying member connected in anti-parallel therewith, said apparatus further comprising a control unit configured to control said at least one semiconductor device to conduct for draining current from said line and by that protecting a said equipment.

"High voltage direct current line" is to be interpreted broadly and includes in this context any line feeding electric power in the form of a direct current to any type of equipment and which is on high voltage potential, i.e. a voltage of at least 1 kV but normally higher, such as well in the order of 100 kV to 1200 kV. Thus, said line does not have to be a direct voltage network in a plant for transmitting electric power between converter stations, although that is a particular application of the present invention.

"Protecting" is here also to be interpreted broadly, and this may for example involve a prevention that the voltage on said line will reach too high levels or that the current fed to said equipment will exceed a predetermined level. Thus, it may be a question of obtaining a better or more preferred operation of said equipment by said "protection", but it may also be a protection of the equipment for preventing failure thereof.

For illuminating the invention but not in any way restricting the scope thereof the case of such an apparatus connected to a direct voltage network interconnecting two converter stations of a plant for transmitting electric power in the form of High Voltage Direct Current will now be briefly discussed. The converter stations are each connected to an alternating voltage network, which may include generators of electric power and/or consumers of electric power, and the converter stations have converters adapted to convert direct voltage into alternating voltage and conversely. The level of the voltage of the direct voltage network is defined by one or more capacitors, and if this level gets too high said at least one semiconductor device of said current valve of the apparatus may be turned on and the capacitor may be discharged by draining current to the ground and by that the voltage on the direct voltage network may be reduced to a suitable level, whereupon the semiconductor device is turned off.

It may also happen that for instance a wind power plant connected to one converter station feeds a high amount of electric power, due to extreme conditions, through a first of the converter stations into the direct voltage network, but any consumer or other equipment connected to the other converter station may not be able to take care of this amount of power. Said at least one semiconductor device of the current valve of the apparatus may then be turned on for conducting current into the ground, so that said equipment will not be influenced by said extreme conditions of power generation.

In known apparatuses of the type defined in the introduction a linear resistor is connected in series with said current valve. It is of course a desire to improve such an apparatus already known by making it more reliable and/or less costly.

SUMMARY OF THE INVENTION

The object of the present invention is to provide an apparatus of the type defined in the introduction, which is improved in at least some aspect with respect to such apparatuses already known.

This object is according to the invention obtained by providing such an apparatus in which said ground connecting means further comprises at least one surge arrester configured to connect said current valve to said line and having a threshold voltage being at least 0.5 times the nominal voltage of said line to which the apparatus is configured to be connected.

In known apparatuses of the type described in the introduction the current valve had to withstand the full voltage of the high voltage direct current line, but by connecting said surge arrester in series with the current valve the voltage rating of the current valve may be reduced, since the surge arrester will normally take up a substantial part of the direct voltage of said line. This means in the case of only one semiconductor device in said current valve, which may be the case for "lower" high voltages, that such a semiconductor device with a lower voltage rating and by that less costly may be used. However, in the case of higher voltages, such as for instance in a plant for transmitting electric power through High Voltage Direct Current (HVDC), the current valve will have a high number of semiconductor devices connected in series for being able to together hold the voltage to be held thereby, and the semiconductor devices will all be turned on and turned off simultaneously so as to function as one single switch. The present invention makes it possible to reduce said number of semiconductor devices connected in series considerably and involves by that also a considerable saving of costs. Thus, when anything, such as a fault, which will cause the apparatus to be active, occurs, the current valve will be ordered to conduct, and the voltage of the high voltage direct current line will then be reduced by the surge arrester.

"Threshold voltage" with respect to the voltage across said surge arrester here means the voltage level above which the surge arrester will change from conducting a very low leakage current to conduct a strongly increased current.

According to an embodiment of the invention said at least one surge arrester has a threshold voltage being at least 0.8 times said nominal voltage. This means that a big part of the dc voltage of said line will be taken up by the surge arrester, so that the current valve will then only take a fraction thereof.

According to another embodiment of the invention said at least one surge arrester has a threshold voltage being 0.8 to 1.5 or 1.0 to 1.3 times said nominal voltage. These are suitable levels of said threshold voltage of the surge arrester for obtaining a substantial lowering of the voltage rating of said current valve and also obtaining a suitable voltage of the high voltage direct current line with respect to ground through the surge arrester when the current valve is conducting.

According to another embodiment of the invention said ground connecting means further comprises a resistor connected in parallel with said surge arrester and in series with said current valve and a second surge arrester connected in series with the surge arrester first mentioned and in parallel with said current valve and connected to ground. This configuration of said ground connecting means obtains a favourable balancing of leakage currents in both the first mentioned surge arrester and the current valve. Said resistor will supply the leakage current to the current valve, whereas said second surge arrester will both protect the current valve and balance the leakage current from the surge arrester connected in series with the current valve.

According to another embodiment of the invention said current valve comprises a plurality, advantageously at least 5 and preferably at least 10, of said semiconductor devices connected in series. The number of these semiconductor devices will in an apparatus according to the invention be considerably reduced thanks to the arrangement of said surge arrester in said ground connecting means and by that costs will be saved.

According to another embodiment of the invention said current valve comprises at least one high ohmic resistor connected in parallel with said series connection of semiconductor devices for voltage distribution inside the current valve. The arrangement of this high ohmic resistor results in an even voltage distribution inside the current valve and by that an increased reliability and a reduced risk of failure of any semiconductor device in the current valve.

According to another embodiment of the invention said at least one semiconductor device is an IGBT (Insulating Gate Bipolar Transistor), an IGCT (Integrated Gate Commutated Thyristor) or a GTO (Gate Turn-Off Thyristor). These are advantageous semiconductor devices for said current valve, although also other semiconductor devices are conceivable.

According to another embodiment of the invention said ground connecting means are configured to connect to a direct voltage network for transmitting High Voltage Direct Current (HVDC), where the direct voltage network is connected to a converter station having at least one Voltage Source Converter having an alternating voltage side connected to an alternating voltage network and being configured to convert alternating voltage into direct voltage and conversely. An apparatus of this type is particularly advantageous when configured for this application, since the voltage levels of the direct voltage network will be high and by that considerable saving of costs may be obtained for such an apparatus. It may then also be efficiently used to control the voltage level of the direct voltage network and by that of the direct voltage side of said Voltage Source Converter.

According to another embodiment of the invention, constituting a further development of the embodiment last mentioned, the apparatus comprises a detector configured to detect the level of the voltage on said direct voltage network and to send information thereabout to said control unit, and the control unit is configured to carry out the control of the current valve in dependence upon information from said detector. This means that the apparatus may efficiently control the level of the direct voltage on said direct voltage network.

According to another embodiment of the invention the control unit is configured to control the current valve to conduct if the voltage detected by the detector exceeds a predetermined level. Accordingly, the apparatus may be used to ensure that the voltage on said direct voltage network does not get too high.

According to another embodiment of the invention the apparatus comprises a detector configured to measure the current flowing in said direct voltage network and to send information thereabout to said control unit, and the control unit is configured to control said current valve to conduct if the current detected by said detector exceeds a predetermined value. This makes it possible to reliably and efficiently protect equipment on the alternating voltage side of said converter station against overcurrents that may occur on the direct voltage network.

According to another embodiment of the invention the apparatus is configured to protect equipment connected to a High Voltage Direct Current line with a nominal voltage kV, 100 kV, 100 kV to 1200 kV or 400 kV to 1200 kV.

The invention also relates to a high voltage arrangement comprising a line configured to conduct a direct current on high voltage potential and through this line feed electric power to equipment belonging to said arrangement, in which the arrangement further comprises an apparatus according to the present invention for protecting said equipment. Such a high voltage arrangement will have a reliable operation by protection of the equipment thereof to an attractively low cost.

The invention also relates to a plant for transmitting electric power comprising a direct voltage network and at least one alternating voltage network connected thereto through a station, said station being adapted to perform transmitting of electric power between the direct voltage network and the alternating voltage network and comprising at least one Voltage Source Converter adapted to convert direct voltage into alternating voltage and conversely, in which said plant comprises an apparatus according to the present invention connected to said direct voltage network. Such a plant will thanks to said apparatus according to the present invention have advantages discussed above.

Further advantages and advantageous features of the invention will appear from the following description.

BRIEF DESCRIPTION OF THE DRAWING

With reference to the appended drawing, below follows a specific description of embodiments of the invention cited as examples.

In the drawing.

DETAILED DESCRIPTION OF EMBODIMENTS OF THE INVENTION

An apparatus according to two embodiments of the invention will be described hereinafter by way of examples. The invention may, however, be embodied in many different forms and should not be construed as being limited to the exemplary embodiments set forth herein; rather, these embodiments are provided so that this disclosure will be thorough and complete, and will fully convey the concept of the invention to those skilled in the art.

Figure 1:
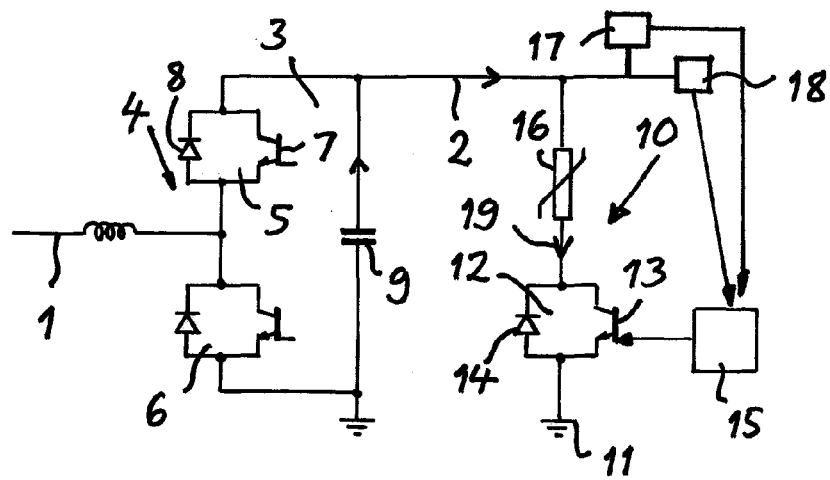
FIG. 1 is a very schematic diagram illustrating an apparatus according to a first embodiment of the invention connected to a direct voltage network connected to a converter station having a Voltage Source Converter.

FIG. 1 illustrates very schematically an apparatus according to a first embodiment of the invention for protecting equipment, here illustrated by an alternating voltage network 1 connected to a high voltage direct current line in the form of a direct voltage network 2 being a part of a plant for transmitting electric power through High Voltage Direct Current (HVDC). A converter station 3 of this plant having a Voltage Source Converter 4 for converting alternating voltage into direct voltage and conversely connected to the direct voltage network 2 is very schematically illustrated. Only two valves 5, 6 with a semiconductor device 7 of turn-off type and a rectifying member in the form of a diode 8 connected in anti-parallel therewith are shown for one phase of the alternating voltage network. Thus, a number of other equipment, such as filters and the like, having nothing to do with the present invention, have been omitted. A capacitor 9 is arranged for defining the voltage of the direct voltage network 2.

An apparatus according to the invention has ground connecting means 10 enabling connecting of the direct voltage network 2 to the ground or earth 11. This ground connecting means comprises a current valve 12 having at least one semiconductor device 13 (the symbol therefor may here stand for a number of such semiconductor devices connected in series) of turn-off type connected with a forward conducting direction thereof towards ground and at least one rectifying member 14, such as a rectifying diode, connected in anti-parallel therewith. The apparatus also comprises a control unit 15 configured to control said at least one semiconductor device to turn on or turn off.

The ground connecting means 10 of the apparatus further comprises at least one surge arrester 16, i.e. an unlinear resistor, such as a zinc oxide arrester, configured to connect said current valve 12 to the direct voltage network 2 and having a threshold voltage being at least 0.5 times, preferably at least 0.8 times, and more preferred between 0.8 and 1.5 or between 1.0 and 1.3 times the nominal voltage of the direct voltage network. This nominal voltage may for a HVDC plant of this type typically be 100 kV to 1200 kV.

The apparatus also comprises a detector 17 configured to detect the level of the voltage on the direct voltage network 2 and send information thereabout to the control unit 15, which is configured to carry out the control of the current valve 12 in dependence upon information from said detector 17.

The apparatus also comprises another detector 18 configured to measure the current flowing in the direct voltage network and to send information thereabout to the control unit 15, which is configured to control the current valve 12 in dependence upon information from this detector 18.

The current valve 12 will normally be non-conducting and the surge arrester will then take up a big part of the dc voltage and the current valve only a fraction.

The function of the apparatus may be as follows. We assume that the nominal voltage of the direct voltage network is 100 kV and the threshold voltage of the surge arrester is also 100 kV. When the detector 17 detects a voltage exceeding a predetermined level, such as 130 kV, the control unit controls the current valve to start to conduct for discharging the capacitor 9 as indicated by the arrow 19. The current valve has in this case only to withstand 30% of the nominal dc voltage, since the surge arrester will take 100 kV.

The control unit 15 may turn the semiconductor devices 13 off when the voltage level on the direct voltage network has reached a desired level, such as said nominal voltage level.

The control unit 15 may also control the current valve to start to conduct if the detector 18 detects a current exceeding a predetermined value, which may for example be 5000 A. This may for instance be the case if we assume that a wind power plant generating electric power is connected to the alternating voltage side of a converter station connected to the other end not shown of the direct voltage network and this as a consequence of extreme conditions will feed an excessive amount of electric power into the direct voltage network and towards the station 3. By then draining the current to ground through the apparatus according to the present invention, the station 3 and possibly sensitive equipment 1 connected thereto may be protected.

Figure 2:
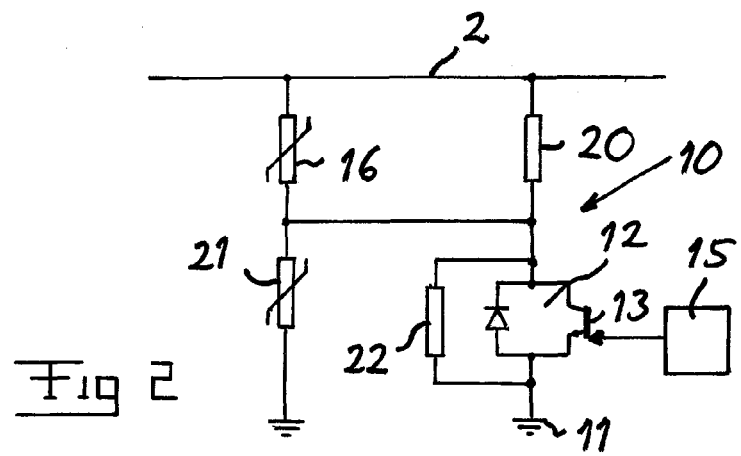
FIG. 2 is a very schematic diagram of an apparatus according to a second embodiment of the invention.

FIG. 2 illustrates schematically an apparatus according to a second embodiment of the invention which differs from the apparatus shown in FIG. 1 by the fact that measures have been taken for balancing the leakage currents of both the surge arrester 16 and the current valve 12. This has been done by connecting a resistor 20 in parallel with the surge arrester 16 and in series with the current valve 12 for supplying leakage current to the current valve 12. Furthermore, a second surge arrester 21 is connected in series with the surge arrester 16 and in parallel with the current valve 12 and connected to ground 11. This second surge arrester will protect the current valve and also balance the leakage current from the surge arrester 16.

Furthermore, the current valve 12 is provided with high ohmic resistors 22 configured to obtain an even voltage distribution inside the current valve 12.

For the rest, the function of the apparatus shown in FIG. 2 is the same as of the apparatus shown in FIG. 1.

Figure 3:
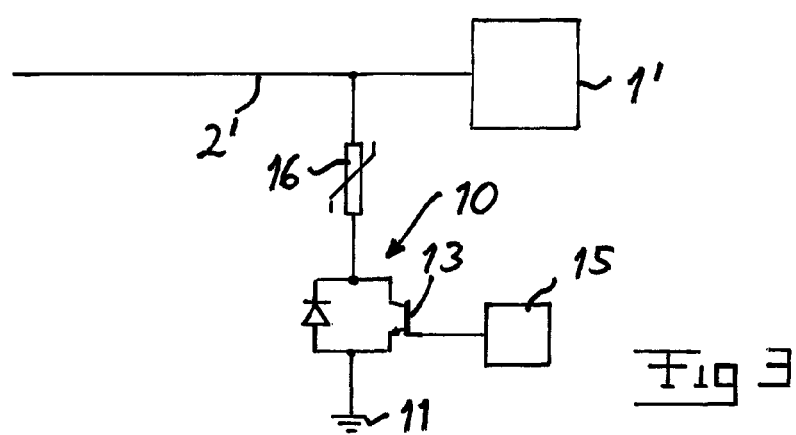
FIG. 3 is a schematic diagram of the apparatus according to said first embodiment of the invention in another application.

Finally, FIG. 3 illustrates very schematically how an apparatus according to the first embodiment of the invention may be connected to an arbitrary high voltage direct current line 2' connected to any type of equipment 1' to be protected by the possibility to drain current from the line 2' to earth 11 through the ground connecting means 10 of the apparatus.

The invention is of course not in any way restricted to the embodiments described above, but many possibilities to modifications thereof will be apparent to a person with ordinary skill in the art without departing from the scope of the invention as defined in the appended claims.

The invention claimed is:

1. An apparatus for protecting equipment connected to a high voltage direct current power line of a direct voltage power transmission network, said apparatus being configured to obtain said protection by having ground connecting means enabling connecting of said line to the ground, said ground connecting means comprising a current valve having at least one semiconductor device of turn-off type connected with a forward conducting direction thereof towards ground and at least one rectifying member connected in anti-parallel therewith, said apparatus further comprising a control unit configured to control said at least one semiconductor device to conduct for draining current from said line and by that protecting said equipment, wherein said ground connecting means further comprises at least one surge arrester configured to connect said current valve to said line and having a threshold voltage being at least 0.5 times the nominal voltage of said line to which the apparatus is configured to be connected, a resistor connected in parallel with said surge arrester and in series with said current valve and a second surge arrester connected in series with the surge arrester first mentioned and in parallel with said current valve and connected to ground.

2. An apparatus according to claim 1, wherein at least one surge arrester has a threshold voltage being at least 0.8 times said nominal voltage.

3. An apparatus according to claim 1, wherein at least one surge arrester has a threshold voltage being between 0.8 and 1.5 or between 1.0 and 1.3 times said nominal voltage.

4. An apparatus according to claim 1, wherein said current valve comprises a plurality, advantageously at least 5 and preferably at least 10, of said semiconductor devices connected in series.

5. An apparatus according to claim 4, wherein said current valve comprises at least one high ohmic resistor connected in parallel with said series connection of semiconductor devices for voltage distribution inside the current valve.

6. An apparatus according to claim 1, wherein at least one semiconductor device is an IGBT (Insulating Gate Bipolar Transistor), an IGCT (Integrated Gate Commutated Thyristor) or a GTO (Gate Turn-Off Thyristor).

7. An apparatus according to claim 1, wherein said ground connecting means are configured to connect to a direct voltage network for transmitting High Voltage Direct Current (HVDC), where said direct voltage network is connected to a converter station having at least one Voltage Source Converter having an alternating voltage side connected to an alternating voltage network and being configured to convert alternating voltage into direct voltage and conversely.

8. An apparatus according to claim 7, wherein it comprises a detector configured to detect the level of the voltage on said direct voltage network and to send information thereabout to said control unit, and that the control unit is configured to carry out the control of the current valve in dependence upon information from said detector.

9. An apparatus according to claim 8, wherein said control unit is configured to control the current valve to conduct if the voltage detected by the detector exceeds a predetermined level.

10. An apparatus according to claim 7, wherein it comprises a detector configured to measure the current flowing in said direct voltage network and to send information thereabout to said control unit, and that the control unit is configured to control said current valve to conduct if the current detected by said detector exceeds a predetermined value.

11. An apparatus according to claim 1, wherein it is configured to protect equipment connected to a High Voltage Direct Current line with a nominal voltage $\leq$1 kV, $\leq$100 kV, 100 kV to 1200 kV or 400 kV to 1200 kV.

12. A high voltage arrangement comprising a power line of a direct voltage power transmission network and configured to conduct a direct current on high voltage potential and through this line feed electric power to equipment belonging to said arrangement, wherein the arrangement further comprises an apparatus according to claim 1 for protecting said equipment.

13. A plant for transmitting electric power comprising a direct voltage power transmission network with a power line and at least one alternating voltage network connected thereto through a station, said station being adapted to perform transmitting of electric power between the direct voltage network and the alternating voltage network and comprising at least one Voltage Source Converter adapted to convert direct voltage into alternating voltage and conversely, wherein the plant comprises an apparatus according to claim 1 connected to said direct voltage network.

14. An apparatus according to claim 2, wherein at least one surge arrester has a threshold voltage being between 0.8 and 1.5 or between 1.0 and 1.3 times said nominal voltage.

15. An apparatus according to claim 2, wherein said current valve comprises a plurality, advantageously at least 5 and preferably at least 10, of said semiconductor devices connected in series.

16. An apparatus according to claim 3, wherein said current valve comprises a plurality, advantageously at least 5 and preferably at least 10, of said semiconductor devices connected in series.

17. An apparatus according to claim 2, wherein at least one semiconductor device is an IGBT (Insulating Gate Bipolar Transistor), an IGCT (Integrated Gate Commutated Thyristor) or a GTO (Gate Turn-Off Thyristor).

18. An apparatus according to claim 3, wherein at least one semiconductor device is an IGBT (Insulating Gate Bipolar Transistor), an IGCT (Integrated Gate Commutated Thyristor) or a GTO (Gate Turn-Off Thyristor).

19. An apparatus according to claim 4, wherein at least one semiconductor device is an IGBT (Insulating Gate Bipolar Transistor), an IGCT (Integrated Gate Commutated Thyristor) or a GTO (Gate Turn-Off Thyristor).

20. An apparatus according to claim 5, wherein at least one semiconductor device is an IGBT (Insulating Gate Bipolar Transistor), an IGCT (Integrated Gate Commutated Thyristor) or a GTO (Gate Turn-Off Thyristor).

\* \* \* \* \*